United States Patent
Robinson et al.

(10) Patent No.: US 7,219,163 B2
(45) Date of Patent: May 15, 2007

(54) METHOD AND SYSTEM THAT TAILORS FORMAT OF TRANSMISSION TO SUIT CLIENT CAPABILITIES AND LINK CHARACTERISTICS

(75) Inventors: Ian N. Robinson, Mountain View, CA (US); Frederick L. Kitson, Livermore, CA (US); Susie J. Wee, San Carlos, CA (US); Mark Smith, San Mateo, CA (US); John G. Apostolopoulos, San Carlos, CA (US); Jason Brown, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 704 days.

(21) Appl. No.: 10/097,792

(22) Filed: Mar. 14, 2002

(65) Prior Publication Data
US 2003/0177269 A1 Sep. 18, 2003

(51) Int. Cl.
*G06F 15/16* (2006.01)
(52) U.S. Cl. .................. 709/246; 709/223; 709/224
(58) Field of Classification Search ........ 709/223–224, 709/226–227, 246, 217–219
See application file for complete search history.

(56) References Cited

U.S. PATENT DOCUMENTS

| | | | | |
|---|---|---|---|---|
| 5,848,415 A * | 12/1998 | Guck | ......................... | 707/10 |
| 6,185,625 B1 * | 2/2001 | Tso et al. | ................... | 709/247 |
| 6,247,050 B1 * | 6/2001 | Tso et al. | ................... | 709/224 |
| 6,421,733 B1 * | 7/2002 | Tso et al. | ................... | 709/246 |
| 6,615,212 B1 * | 9/2003 | Dutta et al. | ................... | 707/10 |
| 6,704,024 B2 * | 3/2004 | Robotham et al. | .......... | 345/581 |

\* cited by examiner

*Primary Examiner*—Ario Etienne
*Assistant Examiner*—Hussein El-chanti

(57) ABSTRACT

A method and system for transmitting information between a transmitter and a receiver that has capabilities through a communication link that has transmission characteristics. The information to be transmitted is received. The capabilities of the client are then determined. The transmission characteristics of the communication link are also determined. The received information is then converted into a format that is based on the capabilities of the client, the transmission characteristics of the communication link, or both the capabilities of the client and the transmission characteristics of the communication link. The information is then transmitted to the client in the format.

21 Claims, 7 Drawing Sheets

METHOD AND SYSTEM THAT TAILORS FORMAT OF TRANSMISSION TO SUIT CLIENT CAPABILITIES AND LINK CHARACTERISTICS

FIELD OF THE INVENTION

The present invention relates generally to data transmission systems, such as systems for transmitting video, graphics, and audio data, and more particularly, to a transmission method and system that tailors the format of data transmission to suit client capabilities and link characteristics.

BACKGROUND OF THE INVENTION

There has been recent interest in systems that enable access to computer sourced data and applications via devices (often referred to as "client" devices) that are simpler and less costly than the traditional personal computer (PC). Two examples of these so-called "client" devices are web-pads and remote-desktop devices.

Web-pads (e.g., the reference design from National Semiconductor, Inc., see http://www.national.com/appinfo/solutions) carry just enough processing power to run a browser application, which is perhaps a lightweight or thin version of the usual PC browser program. Data and applications are transmitted to the device in the form of web pages that are typically sourced from servers on the Internet. By employing a Hypertext Mark-Up Language (HTML) format, a number of different screen sizes, and hence client form-factors, can be supported.

Unfortunately, this prior art approach incurs the cost of requiring sufficient processing power at the client to run the browser application. This processing requirement is significantly increased when support is required for popular multimedia data-types and their associated plug-ins, such as, Flash™ files (Flash™ player available from Macromedia, Inc. of San Francisco, Calif.), audio files (e.g., MP3 audio files), and video files.

In the case of a remote-desktop device, a local PC acts as the server, and transmits the data necessary to support a remote instance of its desktop interface (e.g., Windows™) on the client's screen. In this prior art approach, the graphics system calls (e.g., draw rectangle and draw text string) are transmitted between an application and the rendering software/hardware. For example, "Windows Terminal Services", which is available from Microsoft, Inc. of Redmond, Wash., and "WinFrame", which is available from Citrix Systems, Inc. of Fort Lauderdale, Fla., transmit the graphics system calls (e.g., draw rectangle and draw text string) between an application and the rendering software/hardware.

One disadvantage of this approach is that the remote-desktop device requires sufficient processing power to render the graphics system calls that the device receives. For certain applications, these processing power requirements exceed the maximum size restrictions, maximum weight restrictions, and maximum power consumption requirements of the applications.

Furthermore, although this prior art approach provides tolerable results when simple shapes and text are involved, unfortunately, when multimedia data-types are involved, this prior art approach performs poorly, if at all. For example, in the case of video data, the application renders directly to the screen. Consequently, if video is supported at all, every frame must be sent as a bitmap to the client, which can lead to high bandwidth requirements, especially where wireless links are concerned.

Both prior art approaches also assume that a small client screen size precludes conventional, PC-like, interaction, and that such PC-like interaction is not possible for very small displays (e.g., displays of a cell-phone or a display of a wrist-watch)

Another disadvantage of these approaches is that the quality of the communication link between the PC the portable display unit is not adequately addressed. As can be appreciated, the quality of the communication link is very important. A present challenge is that a number of ever-changing factors (e.g., noise and interference in the environment) can adversely affect the transmission of the information between the PC and the display unit. When the quality of the communication link is not adequately addressed in the transmission scheme, considerable risk is taken that data may be lost or otherwise corrupted.

Accordingly, it would be desirable for there to be a mechanism that enables low cost, compact, lightweight, low power client devices to display media-rich information and that overcomes the disadvantages set forth previously.

SUMMARY OF THE INVENTION

According to one embodiment of the present invention, a method and system that tailors the format of the transmission of data to client capabilities and link characteristics are described.

One aspect of the present invention is the provision of a mechanism that resides at a transmitter (e.g., a server) for determining the capabilities of a target receiver (e.g., a client device) and converts data to be transmitted into a format that is suited for the capabilities of the target receiver. For example, the format of the data can be complex (e.g., a fully encoded DVD movie), very simple (e.g., pixels ready for display without any decoding), or something therebetween.

Another aspect of the present invention is the provision of a mechanism that resides at a transmitter (e.g., a server) for determining (e.g., periodically) the characteristics of the communication link between the server and a target client device and tailoring (e.g., optimizing) the transmission based on the link characteristics.

Another aspect of the present invention is the provision of a mechanism that resides at a transmitter (e.g., a server) for performing the one or more processing functions (e.g., decoding and rendering functions), which are typically performed at the receiving device, thereby enabling the receiving device (e.g., a client device) to be designed with reduced cost, reduced space requirements, reduced weight, and reduced power requirements.

Another aspect of the present invention is the provision of a mechanism that resides at a transmitter (e.g., a server) for performing the decoding function, thereby making a decoder unnecessary at the receiving device (e.g., a client device).

Another aspect of the present invention is the provision of a mechanism that resides at a transmitter (e.g., a server) for performing rendering functions, thereby making a rendering engine unnecessary at the receiving device (e.g., a client device).

According to one embodiment, a method and system for transmitting information between a transmitting device and a receiving device that has capabilities through a communication link that has transmission characteristics are described. The information to be transmitted is received. The capabilities of the receiving device (e.g., a client device) are then determined. The transmission characteristics of the communication link are also determined. The received information is then converted into a format that is based on the capabilities of the client, the transmission characteristics of the communication link, or both the capabilities of the client and the transmission characteristics of the communication link. The tailored information is then transmitted to the receiving device (e.g., a client device).

Consequently, the mechanism of the present invention shifts the decoding functionality, the rendering functionality, or both to the transmitting device (e.g., a server), thereby simplifying the design of the receiving device (e.g., a client device) and enabling the receiving device to be more compact, light-weight, lower cost, and operate with lower power requirements.

According to another embodiment, the client device includes a low-resolution display that is compact, low power, and lightweight (e.g., a display in a cellular phone or a wristwatch). The server provides to the client device pixel data that can be directly displayed on this display without any further processing (e.g., without further rendering or decoding). In this manner, arbitrarily complex applications can appear to run on the client device (e.g., animated web pages or video)

Other features and advantages of the present invention will be apparent from the detailed description that follows.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

A transmission method and system that tailors the format of the transmission of data to client capabilities and link characteristics is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

System 100

Figure 1:
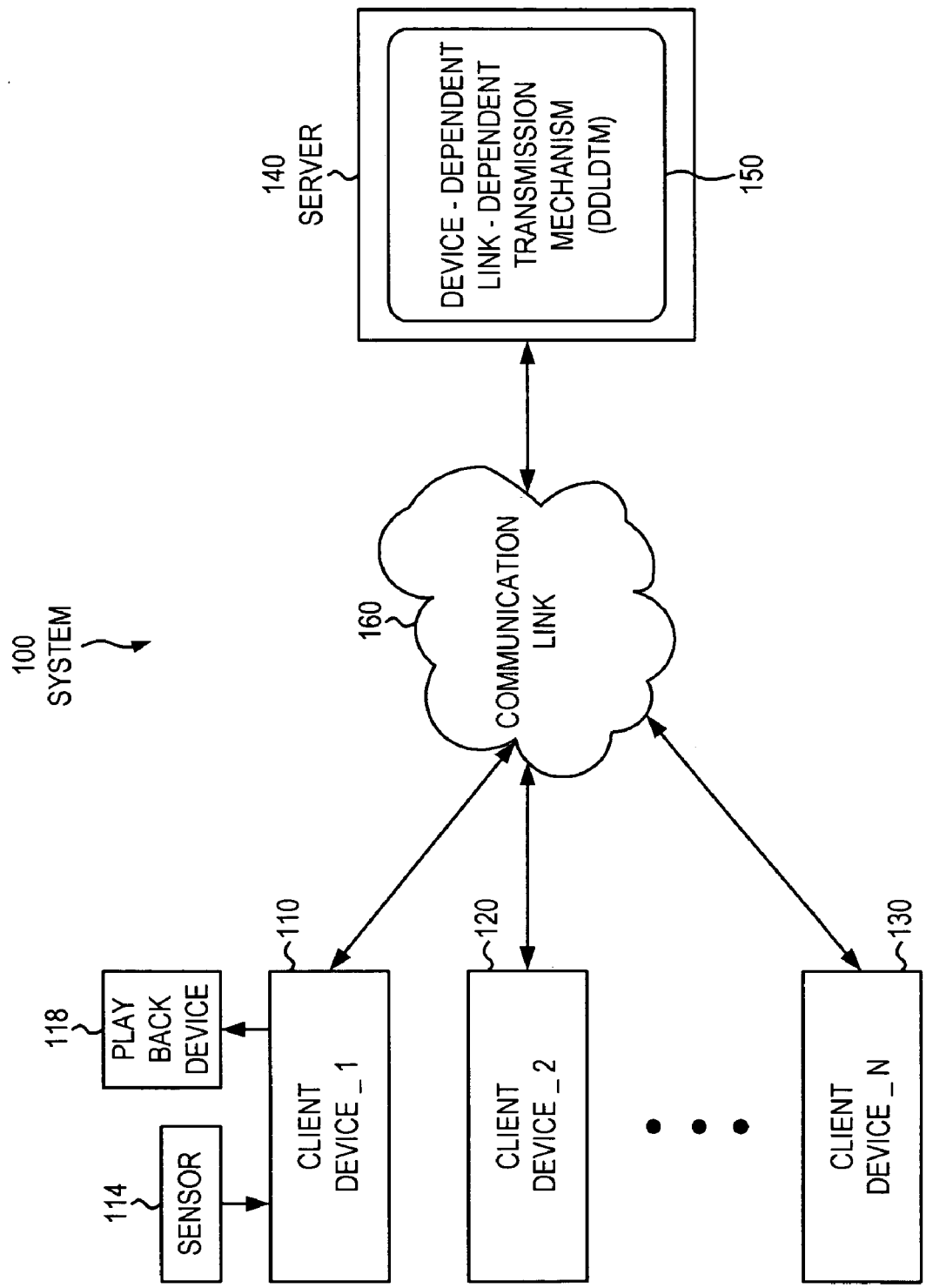
FIG. 1 is a block diagram illustrating an exemplary system in which the client-tailored transmission mechanism of the present invention can be implemented.

FIG. 1 is a block diagram illustrating an exemplary system 100 in which the client-tailored transmission mechanism 150 of the present invention can be implemented. The system 100 includes a plurality of client devices (e.g., client device_1 110, client device_2 120, . . . , and client device_N 130), a server 140, and a communication link 160 for communicating information therebetween. The communication link 160 can be wired or wireless. Each client device (e.g., client device 110) can include a sensor 114 (e.g., a camera, microphone, etc.) and a playback device 118 (e.g., a display for displaying video or a speaker for playing audio files).

The server 140 includes a client-tailored transmission mechanism 150 (also referred to herein as a device dependent and link dependent transmission mechanism (DDLDTM)) for enabling the client devices (e.g., 110, 120, and 130) to provide media-rich information and yet have a compact, lightweight, low power design. One aspect of the present invention is to provide a mechanism 150 to tailor the information being transmitted based on client capabilities or parameters, on the characteristics of a communication link being utilized for the transmission, or on both client parameters and link characteristics. Client parameters and link characterization are described in greater detail hereinafter.

Figure 2:
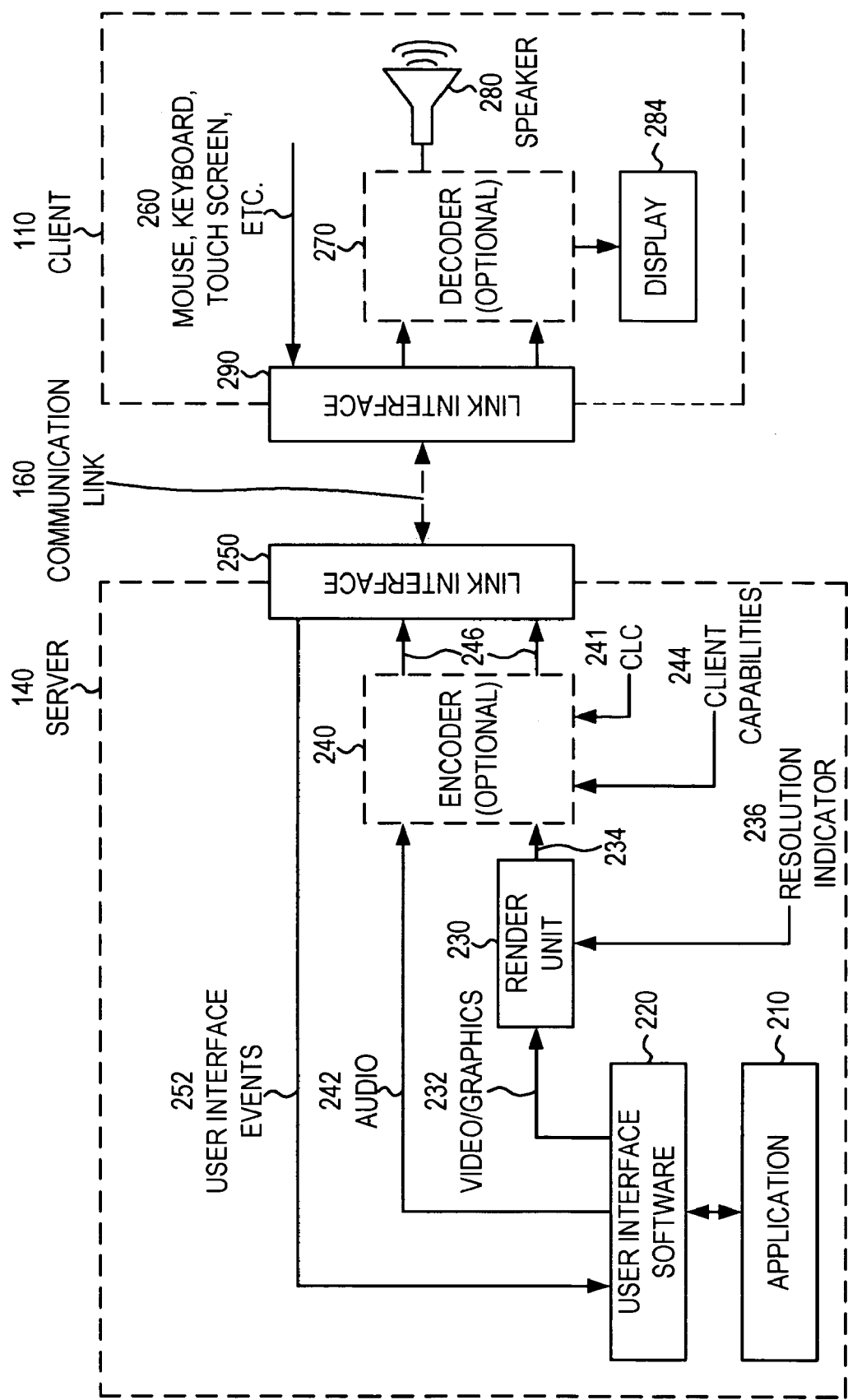
FIG. 2 is block diagram illustrating in greater detail the server and client of FIG. 1.

FIG. 2 is block diagram illustrating in greater detail the server and client of FIG. 1.

Server 140

The server 140 includes an application 210 that transmits some information (e.g., video information, audio information, or multimedia information) and that may receive one or more user inputs. User interface software 220 is provided for receiving user interface events 252 and responsive thereto for generating corresponding signals that can be used by the application 210. These user interface events 252 can include user interaction in the form of text entry, mouse clicks or hot-spot roll-overs (on web pages), and are used by the application 210 to trigger actions (e.g., sending e-mail when the mouse is clicked over the "send" button).

The server 140 also includes a render unit 230 that receives information to be transmitted (e.g., video information 232) and a resolution indicator 236 that specifies the capabilities (e.g., display capabilities) of the target client device 110. The resolution indicator 236 may be provided by the client device 110, for example, at set-up time (e.g., the time when the communication link 160 is established).

Based on these inputs, the render unit 230 generates a client-specific version 234 of the information (e.g., information that is tailored to the resolution capabilities of the client). The resolution specific version 234 of the information is tailored for playback (e.g., display) on the client device 110. It is noted that render unit 230 can be implemented in software, hardware, firmware, or a combination thereof.

In one embodiment, the render unit 230 performs the rendering functionality at the server 140 that is typically performed by the prior art at the client device. By moving the rendering functionality to the server 140, the transmission system of the present invention allows the client device 110 to be simplified and reduced in cost. For the case of Web pages, the rendering can involve receiving the HTML file, interpreting the HTML file and converting the HTML file into a format that can be displayed by the client 110 with no processing or minimal processing.

In one embodiment, the render unit 230 or the encoder 240 is implemented with a software layer (e.g., code for rendering of encoding) that performs client tailored translation into a format that is suited for the client capabilities and optimized for the bandwidth currently available from the communication link. The translation can include, but is not limited to, down sampling the information, converting a first stream that is encoded by a first encoding scheme into a second stream that is encoded by a second encoding stream, re-formatting the information to fit a smaller screen and enabling the user to scroll around the page of information. Preferably, this translation is transparent to the application (e.g., application 210) that is providing the information or requesting transmission services.

The server 140 also optionally includes an encoder unit 240 that is configured to receive information to be transmitted (e.g., audio 242 or the output 234 of the render unit 230) and client capabilities 244 and communication link characteristics (CLC) 241. Based on these inputs, the encoder unit 240 encodes the received information, thereby generating client-specific and channel-specific encoded information 246. The client-specific and channel-specific encoded information 246 is based on the processing capabilities 244 of the client device and the characteristics of the communication link (CCL) 241 (e.g., bandwidth of the communication link, bit error rate of the communication link, packet loss rate due to the communication link, and the latency of the communication link).

The encoder unit 240 can be implemented in software, hardware, firmware, or a combination thereof. It is noted that the encoder unit 240 is optional and may be omitted for certain applications. An example of such an application is where the client device is unable to support a local decoder 270 due to space constraints.

The server 140 also includes a communication link interface 250 that is coupled to the communication link 160 for transmitting the processed information and for receiving information transmitted by another device. The communication link 160 has characteristics that affect the transmission through the link 160.

Client 110

The client 110 includes one or more user input devices (e.g., a mouse, keyboard, touch pad, touch screen, etc.) that allow a user to generate one or more user input signals 260. The user input can be transmitted to the server 140 and received by the server 140 as user interface events 252.

The client 110 also includes one or more play back devices (e.g., a speaker 280 and a display 284) for playing back information that is received from the server 140. In one embodiment, the client 110 can be a low resolution, low bandwidth personal device, such as a cellular phone or wristwatch. The device 110 can have embedded therein a small display (e.g., a display having 100×200 pixels).

The DDLDTM 150 of the present invention provides data to clients in a manner and rate that is tailored for the specific client based on the client parameters and link characteristics, thereby providing an efficient transmission system requiring a minimal amount of local processing at the client.

In this regard, the client 110 can include the minimum hardware and/or software that can display data (e.g., pixel information). In the example of a Web page, the render unit 230 converts a mark-up language file (e.g., an HTML file) into pixels that are then sent to the client 110, which then displays the web page. It is noted that the client is not executing a browser program, but is instead simply displaying the pixels of the web page on the display.

Alternatively, the client 110 can include a simple graphics engine that can, for example, display two dimensional primitives (e.g., rectangles) and text (e.g., predetermined fonts of text).

The client 110 also includes a communication link interface 290 for receiving information transmitted by the server 140 and for transmitting information (e.g., user interface events 252, client capabilities 244, display resolution 236, etc.) to the server 140.

The client 110 can also optionally include a local decoder 270 for performing decoding of the received information. In embodiments where the client device can accommodate more processing components, the information can be encoded in the server 140 by employing the optional encoder 240 and subsequently decoded by the local decoder 270. The decoded information can be provided to a playback device, such as the display 284 and the speaker 280.

DDLDTM 150

Figure 3:
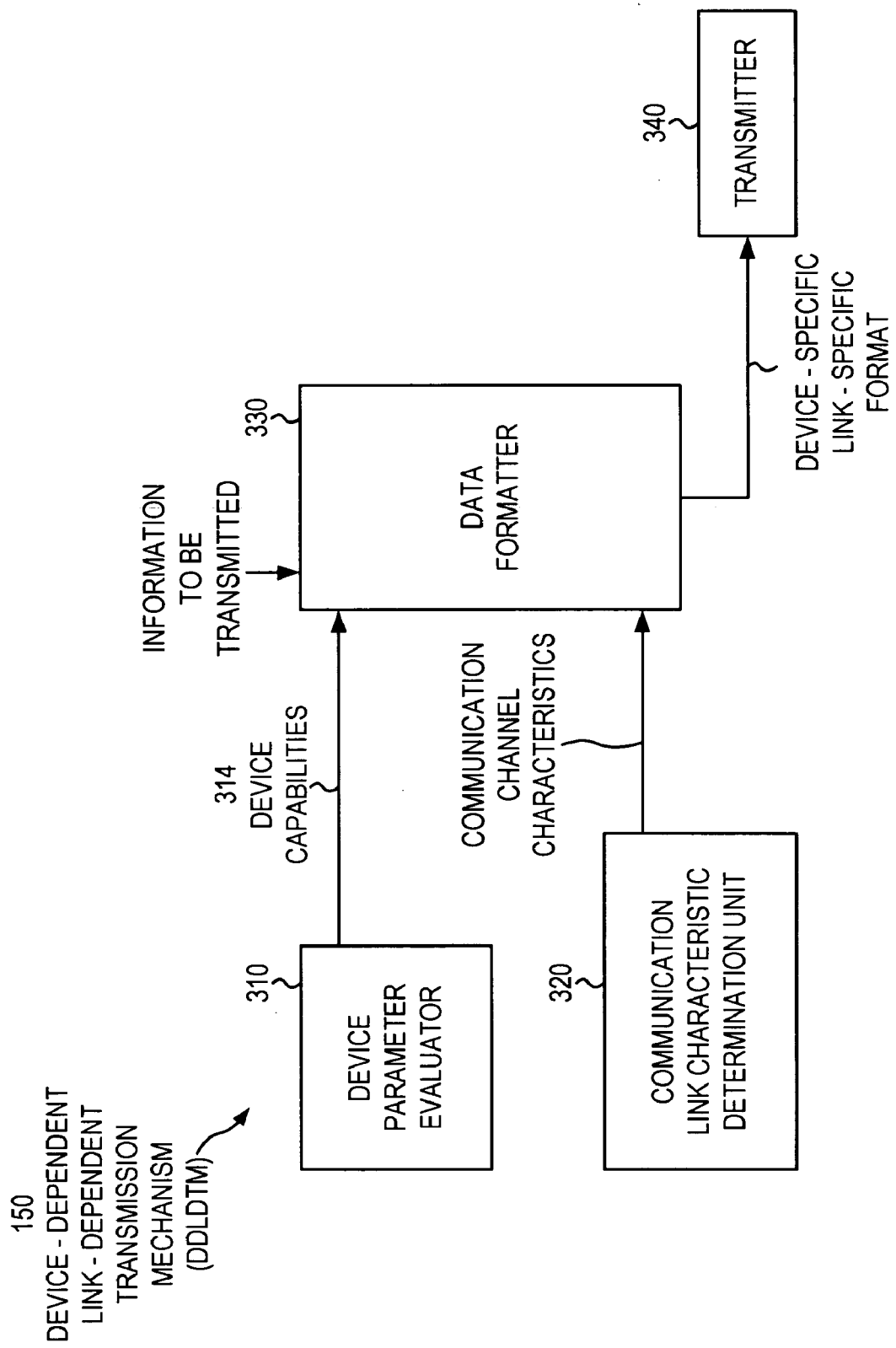
FIG. 3 is a block diagram illustrating in greater detail the device dependent and link dependent transmission mechanism of FIG. 1.

FIG. 3 is a block diagram illustrating in greater detail the DDLDTM 150 of FIG. 1. The DDLDTM 150 includes a device parameter evaluator 310 for determining the device parameters and capabilities (e.g., playback resolution) of the target client device. The DDLDTM 150 also includes a communication link determination unit 320 for determining the characteristics or parameters of the communication channel. The DDLDTM 150 also includes a formatter 330 for receiving the information to be transmitted and formatting the information into a format that considers the capabilities of the target client device, the parameters or characteristics of the communication link, or both.

The DDLDTM 150 also includes a transmitter 340 for sending the information in the device-dependent and link dependent format to the target client device. It is noted that the components of the DDLDTM 150 may be implemented in the render unit 230, the encoder 240, or both the render unit 230 and the encoder 240.

Processing Steps

Figure 4:
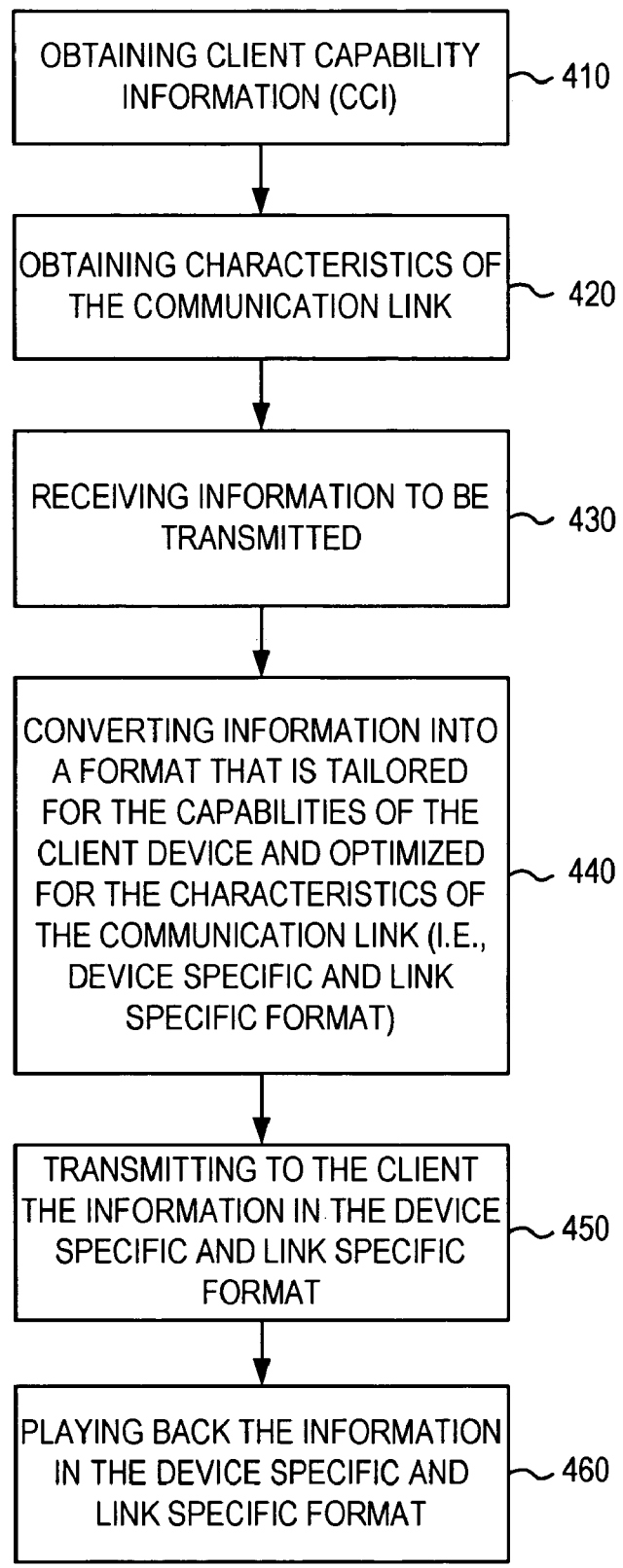
FIG. 4 is a flowchart illustrating the processing steps performed by the device dependent and link dependent transmission mechanism of FIG. 1.

FIG. 4 is a flowchart illustrating the processing steps performed by the device dependent and link dependent transmission mechanism of FIG. 1. In step 410, the client capability information (CCI) is obtained. The server can determine the client's parameters when there is a connection between the server and the client. For example, the client can send the server the client parameters, or the server can request the client parameters from the client. This step can include a handshake phase, in which the server and the client communicate to provide CCI and other related parameters to the server. This step can, for example, occur when the client initially connects to the server. Alternatively, the server can query the client device after connection for the information.

In step 420, the characteristics of the communication link are obtained. The server can perform this step to determine the quality and the amount of bandwidth available in the link. This step can occur in a periodic fashion during the transmission of information since the characteristics of the link have a dynamic nature. The characteristics of the communication link are important since the amount of available bandwidth in a communication link can affect the format of the information to be transmitted. By tailoring the format of the transmitted information to the available bandwidth, the efficiency of the transmission is improved.

Step 420 can include one or more of the following sub-steps: determining the available bandwidth of the communication link, determining the bit error rate of the communication link, determining the packet loss rate due to the communication link, and determining the latency of the communication link.

In step 430, the information to be transmitted is received. In step 440, the information is converted or translated into a format that is tailored for the capabilities of the client device and optimized for the characteristics of the communication link utilized. This format is referred to herein as "device-specific and link-specific format" or as "device-dependent and link-dependent format".

It is noted that in an alternative embodiment, the information may be converted into a format that is tailored to the capabilities of the client device, but not optimized for the characteristics of the communication link (referred to herein as a "device-specific format" or "device-dependent format"). In yet another alternative embodiment, the information may be converted into a format that is optimized for the characteristics of the communication link, but that does not consider the capabilities of the client device (referred to herein as a "link-specific format" or "link-dependent format").

In step 450, the device specific and link specific format of the information is transmitted to the client. In step 460, the information in the device specific and link specific format is played back (e.g., displayed or otherwise rendered). As described previously, depending on the capabilities of the client device and the specific application, the information in the device specific and link specific format may be directly rendered without any local processing. This format can be very simple format, such as simple text plus rectangles, a very complex format, such as MPEG-2 encoded data, or any format with an intermediate complexity.

Since the rendering and decoding functionalities are performed by the server, the client device can be low cost, light weight, low power, compact, and yet offer media-rich content. Furthermore, the communication link 160 may be a low-bandwidth link.

Figure 5:
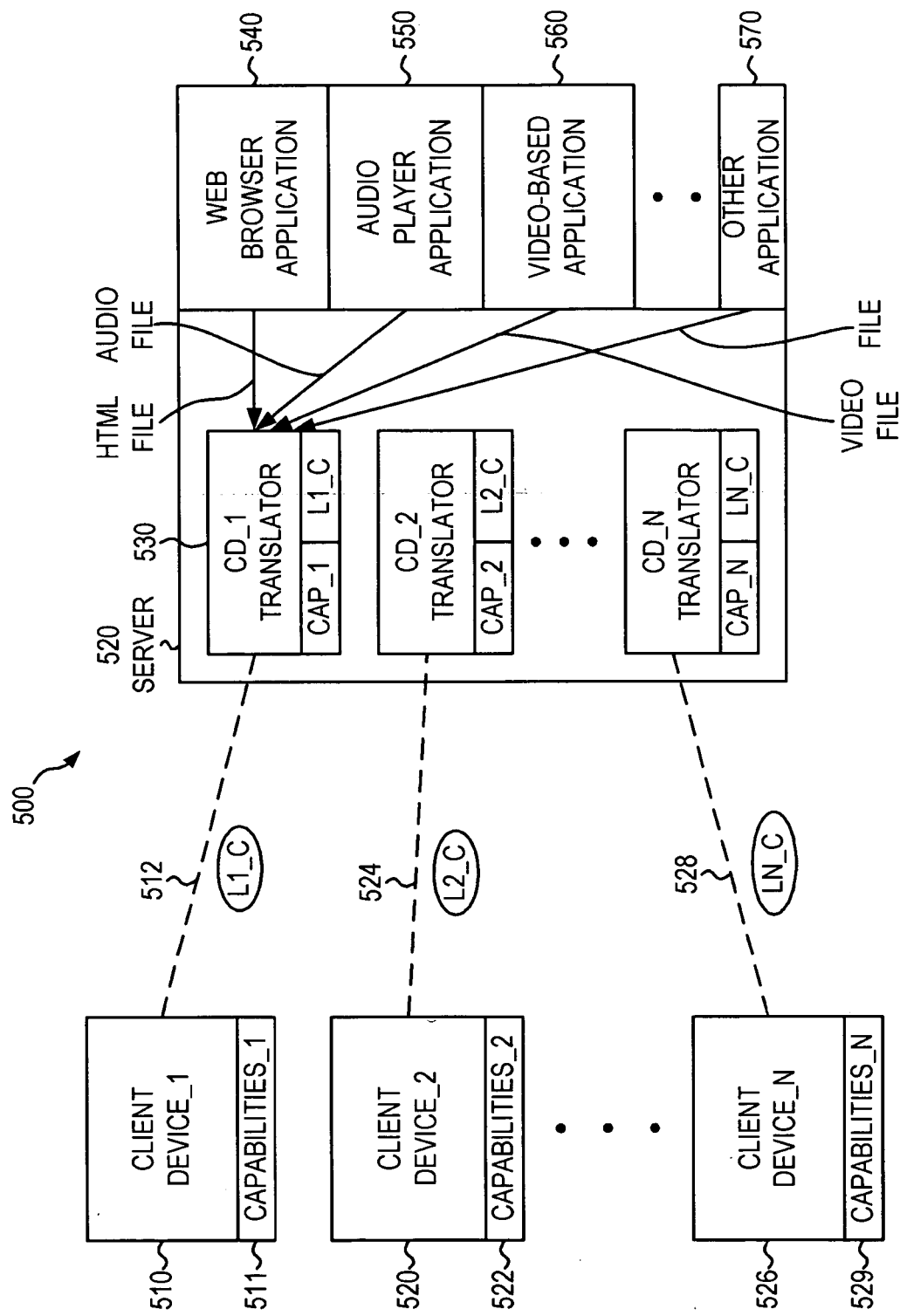
FIG. 5 illustrates an embodiment of the present invention in which there is a device specific translator for each client device.

FIG. 5 illustrates a system 500 in which there is a device specific translator 530 for each client device in accordance with one embodiment of the present invention. System 500 includes a plurality of client devices (e.g., client device_1 510, client device_2 520, . . . and client device_N 526). A first client device 510 includes a first set of capabilities 511 and is coupled to the server 520 through a first link 512 that has first link characteristics (LC_1). A second client device 520 includes a second set of capabilities 522 and is coupled to the server 520 through a second link 524 that has second link characteristics (LC_2). An Nth client device 526 has an Nth set of capabilities 529 and is coupled to the server 520 through an Nth link 512 that has Nth link characteristics (LC_1).

It is noted that the capabilities of the different client devices can be the same or different from each other. It is further noted that the capabilities of the client devices can change over time. For example, software or hardware may be added to the client device or upgraded, thereby increasing the processing power (e.g., the decoding functionality) of the client device.

It is further noted that the characteristics of the different links may be the same or different from each other. Moreover, the characteristics of a specific link may change in a dynamic fashion. For example, the traffic on a particular communication link (e.g., network traffic) can vary over time.

The server 520 includes a plurality of translators (e.g., CD_1 translator, CD_2 translator, . . . and CD_N translator). Each translator is associated with a specific client device (i.e., each translator is device-specific). Each translator includes the device capabilities (CAP_1) of the respective client device and the link characteristics (LC_1) of the communication link being employed for communication between the client device and the server 520.

The CD_1 translator 530 can receive information from a plurality of different sources. For example, these sources can include a web browser application 540 that provides HTML files, an audio player application 550 that provides MP3 audio files, a video based application 560 for providing streaming video, and other applications 570, such as multimedia applications, teleconference applications, etc.

Each translator determines the capabilities of the respective client device and the characteristics of the link. The capabilities and link characteristics may be stored for reference. The translator then tailors or translates the data received from the applications (e.g., 540, 550, 560, and 570) into a device specific and link specific format based on the capabilities of the target client device and the characteristics of the link. The device specific and link specific format, which is optimized for both the receiving device and the bandwidth of the communication link, is then transmitted to the client device via the communication link. It is noted that in one embodiment, the translator automatically adapts the format of the output to suit changing or varying device capabilities and/or link characteristics.

It is noted that the applications (e.g., applications 540, 550, 560, 570) may be remotely disposed from the translators (e.g., on another server or other location in a network). Also, in an alternative embodiment, the translators can be integrated into each specific application (e.g., applications 540, 550, 560, 570).

Figure 6:
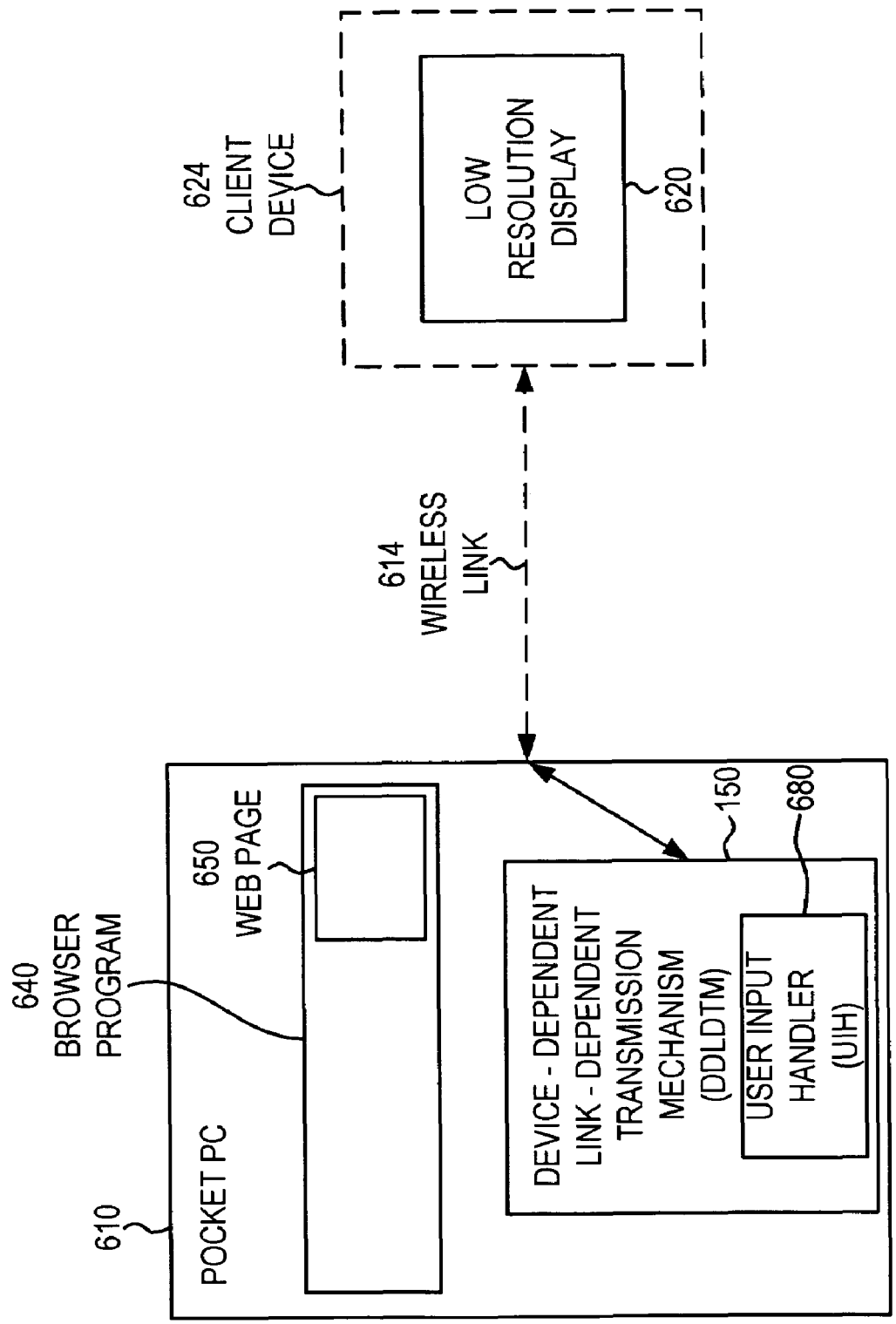
FIG. 6 illustrates a first transmission system configured in accordance with one embodiment of the present invention.

FIG. 6 illustrates a first transmission system 600 configured in accordance with one embodiment of the present invention. The first transmission system 600 includes a pocket PC 610 (e.g., the Jornada available from HP, Inc. of Palo Alto, Calif.) that has the device-dependent and link-dependent transmission mechanism (DDLDTM) 150 of the present invention. The system 600 also includes a low resolution display 620, which can, for example, be a display embedded in a client device 624 (e.g., a cellphone or wristwatch). The pocket PC 610 and the low resolution display 620 communicate via a communication link 614, such as a wired link or a wireless link as shown.

In an exemplary application, the pocket PC 610 can be running a web browser program 640. A web page 650 is first sent to the device-dependent and link-dependent transmission mechanism (DDLDTM) 150. The DDLDTM 150 in turn converts the web page into corresponding pixels that may be transmitted to the display 620. The user can then view the web page 650 as if the client device 624 were running a browser program. However, it is noted that the client device 624 is in reality only displaying the pixels that are sent to the display from the pocket PC 610. The user can then use a stylus to select buttons or other graphical user interface features on the display 620. These user commands are sent to the pocket PC 610. The device-dependent and link-dependent transmission mechanism (DDLDTM) 150 includes a user-input handler (UIH) 680 that in turn convert these user commands into corresponding web browser commands.

In this manner, the client device with a small display or screen can display video and graphics, such as Web pages with moving elements (e.g., QuickTime movies or Flash graphics).

According to another embodiment, the client device also includes a low-resolution display that is compact, low power, and lightweight. However, the server provides the client device data (e.g., text and two-dimensional primitives, such as rectangles) that can be displayed with minimal processing (e.g., with minimal rendering). In this example, the client device includes a simple graphics engine for receiving text and two-dimensional primitives and based thereon for generating pixels for display.

Figure 7:
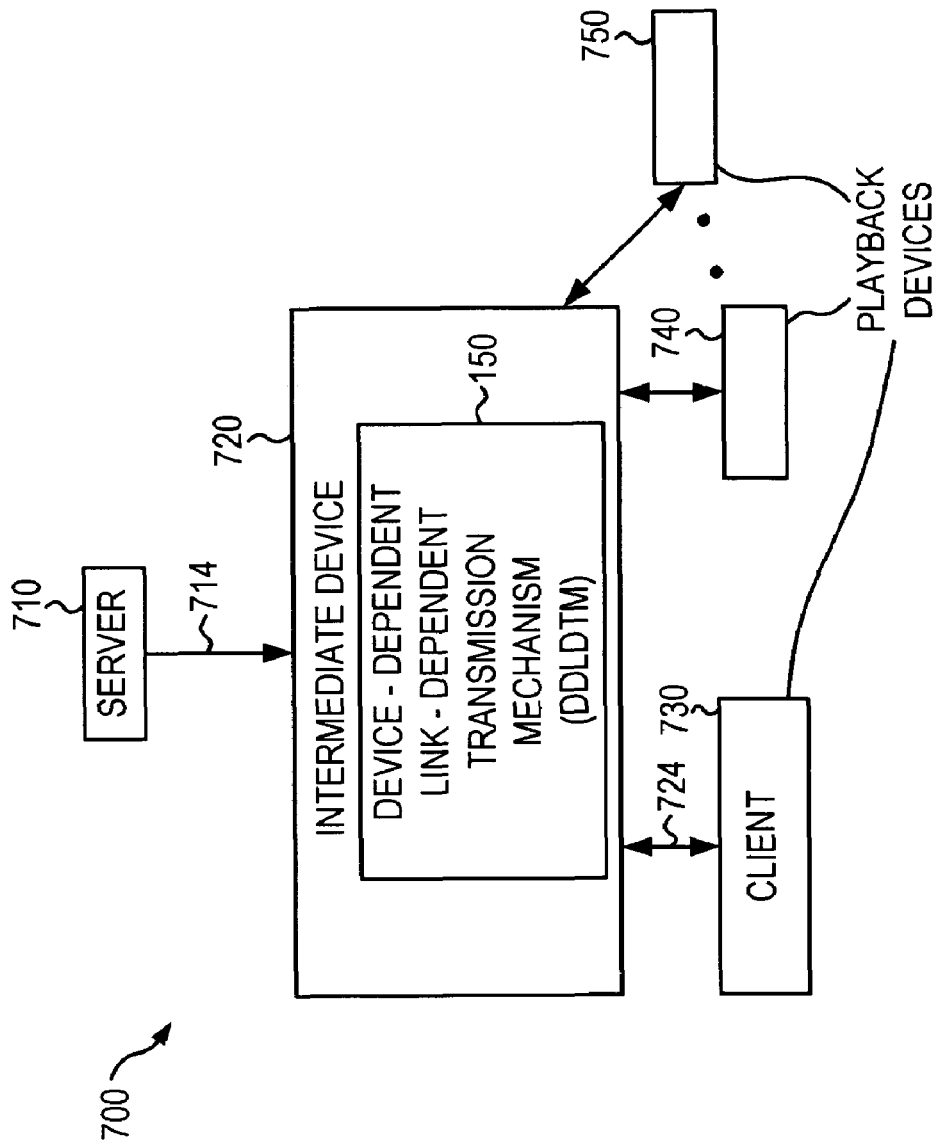
FIG. 7 illustrates a second transmission system configured in accordance with a second embodiment of the present invention.

FIG. 7 illustrates a second transmission system 700 configured in accordance with a second embodiment of the present invention. The second transmission system 700 includes a server 710, an intermediate device 720 and one or more client devices, which is also referred to herein as target playback devices (e.g., 730, 740, and 750).

In one embodiment, the communication link 714 between the server 710 and the intermediate device 720 has a high data rate, and the communication link 724 between the intermediate device 720 and the client has a lower data rate. The intermediate device 720 can be a pocket personal computer (PC) that includes the device-dependent and link-dependent transmission mechanism (DDLDTM) 150 of the present invention. The device-dependent and link-dependent transmission mechanism (DDLDTM) 150 can perform downsampling on the data received from the server 710 and tailor the information into a format that is acceptable to the client(s) and/or that is tailored for the characteristics of the communication link 724 between the intermediate device 720 and the client(s).

In another embodiment, the intermediate device 720 can be a home personal computer (PC) that is receiving data from a cable modem. The home PC then converts the received information into a format that is suitable for display by a client (e.g., a portable device in the home or a stationary appliance) and that is tailored for the characteristics of the communication link between the home PC and the client.

When the intermediate device 720 receives encoded data from the server 710, the intermediate device 720 can transcode the information into another encoded format having a lower data rate.

The client devices (e.g., 730, 740, and 750) can be, for example, but are not limited to, an alarm clocks, household appliances, picture frame displays, portable devices, stationary devices, or other play back devices.

Client Parameters

The client parameters can include, for example, the resolution of the display, the frame rate of the display, the client's processing power, the client's capabilities for error detection and correction, and the types of encoded data that the client can decode. When the client is a display device for displaying video, the resolution can be expressed in terms of the number of pixels (e.g., number or rows×number of columns) and the color depth (e.g., 1 bit, 8 bit, 24 bit, etc.). The frame rate indicates how often the display is refreshed and can be expressed as the number of frames per second and can vary depending on the application. For example, 30 frames per second may be required for high quality video, and 2 to 3 frames per second are adequate for the display of most web pages.

Similarly, for audio data, exemplary client parameters include the sampling rate of the client device and the number of bits used to encode the sound.

Another client parameter is the processing power of the client device. For example, a client can specify to the server the types of encoded data that the client can decode. For example, a particular client device can specify that the client can decode MJPEG compressed video and MP-3 compressed audio, but not MPEG-2 compressed video. It is noted that MJPEG is easier to decode than MPEG2.

Also, the client device can use a table or matrix that specifies the applications (e.g., applets) that the client can execute to decode various types of encoded video or audio. The client device can also provide an objective measure (e.g., a benchmark in terms of instructions per second) of the client's processing power.

Link Characterization

The communication link between the server and the client has a quality of service that can vary due to environmental conditions, number of other devices utilizing bandwidth, etc. The quality of service can be expressed as the number of bits per second that can be transferred across the communication link. The link characterization unit 320 in the DDLDTM 150 of the present invention detects the quality of service and then the DDLDTM 150 sends the data at a rate that utilizes the bandwidth available without exceeding the same.

For example, the link characterization unit 320 (also referred to herein as a communication link characteristic determination unit) can periodically check the communication link for the data rate for information transfer. When a client can handle a data rate of 500 Kbps, and the link can only carry 50 Kbps; the mechanism 150 of the present invention causes the server to send the information only at the 50 Kbps.

It is noted that typically, the communication link is the limiting factor for the maximum rate of data transfer. However, there are certain cases, such as a corporate wireless local area network (e.g., a wireless LAN compliant with IEEE 802.11) that can provide links having data rates in the Mbps range, where the capabilities of the client device to process data can be the limiting factor.

A local radio frequency link (e.g., an RF link compliant with Bluetooth standard) has a stated data rate of 700 Kbps. However, the effective data rate is about 200 to 300 Kbps after bandwidth is allocated for header information, communication protocols, etc. Cellular links can provide data rates of about 10 Kbps to 300 Kbps for third generation cellular phones.

The handshaking between the server and client is preferably implemented with an application programming interface (API) that specifies how client parameters are communicated to the server and how link characteristics are determined and provided to the server. For example, there can be a mechanism for the server to query the client device when the link therebetween is initially established in order to provide client parameters (e.g., a bit string) to the server.

By specifying the types of error detection and error correction capabilities of the client, the server can then optimize the format and content of the transmission (e.g., redundant bits) to utilize these capabilities. In the same manner, the device dependent transmission mechanism 150 of the present invention prevents the server from inefficiently sending information to the client that cannot be utilized by the client device.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A method for transmitting information between a server and a client that has capabilities through a communication link that has transmission characteristics comprising the steps of:

said server receiving information to be transmitted;

determining the capabilities of the client by at least determining an error detection and correction capability of the client;

determining the transmission characteristics of the communication link by determining at least a bit error rate of the communication link;

converting the received information into a client-dependent and link-dependent format that is based on the determined capabilities of the client and the determined transmission characteristics of the communication link; and transmitting the information in the client-dependent and link-dependent format to the client.

2. The method of claim 1 wherein converting the received information into a client-dependent and link-dependent format information that is based on the capabilities of the client and the transmission characteristics of the communication link includes:

decoding the received information; and one of rendering the decoded information to generate text and two-dimensional graphical primitives and rendering the decoded information to generate displayable pixel data.

3. The method of claim 1 wherein the step of receiving information to be transmitted includes one of receiving a video stream receiving an audio stream;
receiving an encoded video stream;
receiving an encoded audio stream receiving a text file;
receiving a mark-up language file; and
receiving a multimedia file.

4. The method of claim 1 wherein the step of determining the transmission characteristics of the communication link includes one of:

determining the packet loss rate due to the communication link; and determining the latency of the communication link.

5. The method of claim 1 wherein the client is one of an alarm clocks, household appliances, picture frame displays, portable devices, stationary devices, play back device, wristwatch, and a cellular telephone.

6. The method of claim 1, wherein:

the step of determining the transmission characteristics of the communication link includes periodically determining one of the transmission characteristics of the communication link; and the step of converting the received information includes periodically converting the received information into a client-dependent and link-dependent format that is based on the capabilities of the client and the one of the transmission characteristics as periodically determined.

7. A system comprising:
a) a transmitter;
b) a first receiver that includes capabilities;
c) a communication link for communicating data between the transmitter and the receiver that includes communication link characteristics;
d) a communication link characterization determination unit for determining the communication link characteristics which include a bit error rate of the communication link; and
wherein the transmitter includes a device-dependent link-dependent transmission mechanism, wherein the device-dependent link-dependent transmission mechanism includes a device parameter evaluator for determining the first receiver capabilities for error detection and correction; the transmitter receives information to be transmitted and converts the received information into a format that is based on the determined first receiver capabilities and the determined communication link characteristics.

8. The system of claim 7 wherein the device-dependent link-dependent transmission mechanism further includes
a data formatter, coupled to the device parameter evaluator, for receiving the first receiver capabilities and converting the received information into a device specific format; wherein the device specific format is a format that is based on the capabilities of the first receiver.

9. The system of claim 7 wherein the device-dependent link-dependent transmission mechanism further includes
a data formatter, coupled to the communication link characterization determination unit, for receiving the communication link characteristics and converting the received information into a link specific format; wherein the link specific format is a format that is based on communication link characteristics.

10. The system of claim 9 further comprising:
a transmitter for transmitting to the receiver the information in the link specific format.

11. The system of claim 8,
wherein the data formatter is also coupled to the communication link characterization determination unit, for receiving the communication link characteristics, and
wherein the data formatter converts the received information into a device specific and link specific format; wherein the device specific and link specific format is a format that is based on the receiver capabilities and the communication link characteristics.

12. The system of claim 7, further comprising a second receiver that includes capabilities; and
the device-dependent link-dependent transmission mechanism further includes
a) a first data formatter, coupled to the device parameter evaluator and associated with the first receiver, for receiving the first receiver capabilities and converting the received information into a first device specific format; wherein the first device specific format is a format then is based on the capabilities of the first receiver; and
b) a second data formatter, coupled to the device parameter evaluator and associated with the second receiver, for receiving the second receiver capabilities and converting the received information into a second device specific format; wherein the second device specific format is a format that is based on the capabilities of the second receiver.

13. The system of claim 7, wherein the device-dependent link-dependent transmission mechanism further includes:
the communication link characterization determination unit for periodically determining the communication link characteristics; and
a data formatter, coupled to the communication link characterization determination unit, for receiving the periodic communication link characteristics and periodically converting the received information into a link specific format; wherein the link specific format is a format that is based on the periodic communication link characteristics.

14. A system comprising:
a) a server;
b) a first client that includes capabilities;
c) a communication link for communication data between the server and the client that includes transmission characteristics;
wherein the server includes a device-dependent link-dependent transmission mechanism that includes, a device parameter evaluator for determining the first client capabilities for error detection and correction; and a communication link characterization determination unit for determining the communication link characteristics which include a bit error rate of the communication link;

the device-dependent link-dependent transmission mechanism is for receiving information to be transmitted and converting the received information into a format that is based on the determined capabilities of the first client and the determined communication link characteristics.

15. The system of claim 14 wherein the device-dependent link-dependent transmission mechanism further includes a data formatter, coupled to the device parameter evaluator, for receiving the first client capabilities and converting the received information into a device specific format; wherein the device specific format is a format that is based on the capabilities of the first client.

16. The system of claim 15 further comprising:

a transmitter for transmitting to the first client the information in the device specific format.

17. The system of claim 14 wherein the device-dependent link-dependent transmission mechanism further includes:

a data formatter, coupled to the communication link characterization determination unit, for receiving the communication link characteristics and converting the received information into a link specific format; wherein the link specific format is a format that is based on communication link characteristics.

18. The system of claim 17 further comprising:

a transmitter for transmitting to the receiver the information in the link specific format.

19. The system of claim 15, wherein the data formatter is also coupled to the communication link characterization determination unit, for receiving the communication link characteristics, and wherein the data formatter converts the received information into a device specific and link specific format; wherein the device specific and link specific format is a format that is based on the first client capabilities and the communication link characteristics.

20. The system of claim 14, further comprising a second client that includes capabilities; and the device-independent link-dependent transmission mechanism includes a) the device parameter evaluator for determining both the first client capabilities and the second client capabilities;

b) a first data formatter, coupled to the device parameter evaluator and associated with the first client, for receiving the first client capabilities, storing the first client capabilities, and converting the received information into a first device specific format; wherein the first device specific format is a format that is based on the capabilities of the first client; and b) a second data formatter, coupled to the device parameter evaluator and associated with the second client, for receiving the second client capabilities, storing the second client capabilities, and converting the received information into a second device specific format; wherein the second device specific format is a format that is based on the capabilities of the second client.

21. The system of claim 14, wherein the device-dependent link-dependent transmission mechanism further includes:

the communication link characterization determination unit for periodically determining the communication link characteristics; and a data formatter, coupled to the communication link characterization determination unit, for receiving the periodic communication link characteristics and periodically converting the received information into a link specific format; wherein the link specific format is a format that is based on the periodic communication link characteristics.

* * * * *

UNITED STATES PATENT AND TRADEMARK OFFICE
CERTIFICATE OF CORRECTION

PATENT NO. : 7,219,163 B2
APPLICATION NO. : 10/097792
DATED : May 15, 2007
INVENTOR(S) : Ian N. Robinson et al.

It is certified that error appears in the above-identified patent and that said Letters Patent is hereby corrected as shown below:

In column 11, line 19, in Claim 3, delete "of" and insert -- of: --, therefor.

In column 11, line 20, in Claim 3, delete "video stream" and insert -- video stream; --, therefor.

In column 11, line 22, in Claim 3, delete "stream" and insert -- stream; --, therefor.

In column 11, line 28, in Claim 4, insert -- further -- before "'includes".

In column 12, line 2, in Claim 8, delete "includes" and insert -- includes: --, therefor.

In column 12, line 10, in Claim 9, delete "includes" and insert -- includes: --, therefor.

In column 12, line 38, in Claim 12, delete "then" and insert -- that --, therefor.

In column 13, line 15, in Claim 15, delete "includes" and insert -- includes: --, therefor.

Signed and Sealed this

Twenty-ninth Day of September, 2009

David J. Kappos
*Director of the United States Patent and Trademark Office*